Aug. 11, 1959 E. WILLWACHER ET AL 2,899,647

FREQUENCY SELECTOR OF MICROWAVES

Filed Jan. 16, 1953

Inventor:

ERWIN WILLWACHER AND
HERBERT WEBER
BY:

United States Patent Office 2,899,647

Patented Aug. 11, 1959

2,899,647

FREQUENCY SELECTOR OF MICROWAVES

Erwin Willwacher, Ulm-Soflingen, and Herbert Weber, Ulm (Danube), Germany, assignors to Telefunken Gesellschaft fuer drahtlose Telegraphie G.m.b.H., Hannover, Germany Application January 16, 1953, Serial No. 331,648

Claims priority, application Germany December 4, 1951

7 Claims. (Cl. 331—97)

Figure 1:
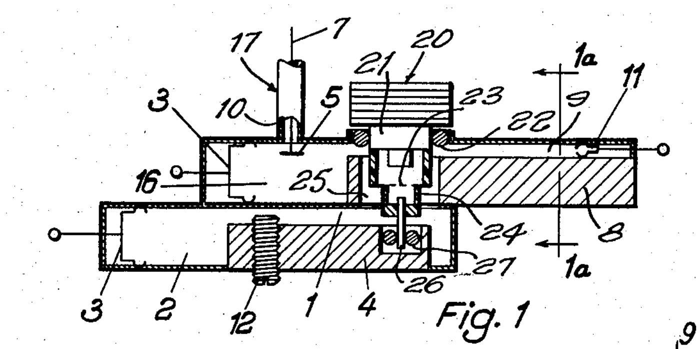

The present invention relates to microwave amplifiers of the type disclosed in our co-pending application Serial Number 323,742, filed December 3, 1952.

In said co-pending application there has been disclosed a wave-translating device comprising a conductive wave guide and a source of high-frequency waves, such as a microwave amplifier or oscillator, in said guide, the wave guide being adapted for the transmission of said high-frequency waves by the provision therein of an elongated capacitive loading member extending in the direction of propagation of these waves. The presence of this bar effectively increases the electrical length of the guide, thereby lowering its cutoff frequency and enlarging the band of transmittable frequencies. A pair of capacitively loaded wave guides, as likewise disclosed in our above-identified application, may serve as the input and output circuits, respectively, of an oscillator or amplifier stage and may be coupled together by means of a slot, e.g. in the form of an annular gap, for the purpose of feeding back energy to sustain oscillations.

The principal object of the present invention is to provide means for selectively controlling the transmission of various harmonically related frequencies adapted to be set up in a wave guide of the aforedescribed character when the same is excited through feedback and/or from an extraneous source of oscillations. The provision of such selective control means is desirable, for example, in the case of an oscillator whose output originally consists of a fundamental frequency and numerous harmonics, the invention thus enabling isolation of the fundamental or of a particular harmonic; another instance calling for selective harmonics suppression in accordance with the invention would be the case of a frequency multiplier in which frequencies other than a particular harmonic of the input frequency are to be suppressed in the output.

The problem of selectively suppressing a certain frequency, or group of frequencies, in a family of harmonically related frequencies for the purpose of isolating the remaining frequency or frequencies is solved, in accordance with our present invention, by the provision of a conductive wave guide in accordance with our prior disclosure in which, however, only a portion of the guide is capacitively loaded by a conductive bar extending longitudinally from a source of waves, another portion of the guide being left unloaded so as to offer a relatively high impedance to the lowest component or components of the frequency spectrum adapted to be transmitted without substantial attenuation through the loaded guide portion. Depending upon the sharpness of tuning of the unloaded guide portion, one or more of the higher-order harmonics of the frequency spectrum emanating from the source will be preferentially concentrated in this unloaded portion and may either be extracted therefrom or dissipated by the provision of loss material therein, thereby enabling selective recovery of either the low-frequency or the high-frequency components of the source output.

Figure 1A:
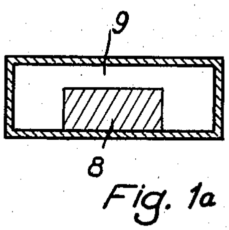
Figure 2:
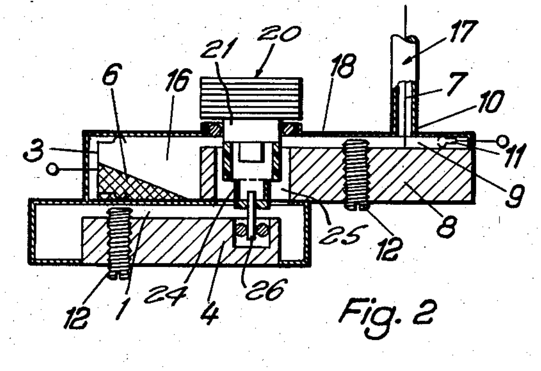
Figure 3:
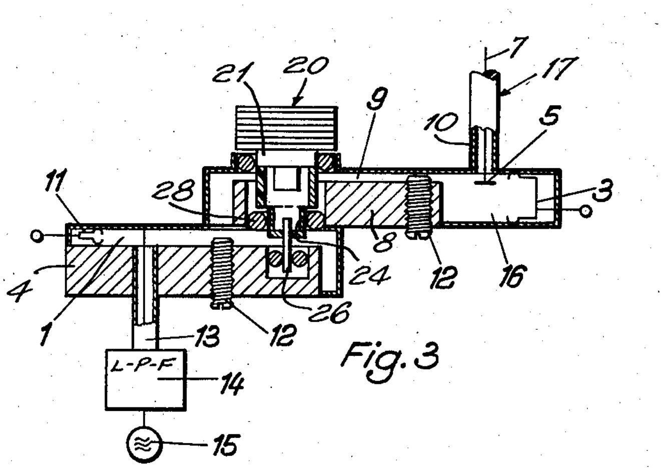

The invention will be more clearly understood from the following detailed description, reference being had to the accompanying drawing in which Figs. 1, 2 and 3 are longitudinal sections of three wave-translating devices each representing a different embodiment. Fig. 1*a* is a cross-section taken along line 1—1 in Fig. 1.

The wave-translaating device shown in Fig. 1 comprises a pair of conductive wave guides of rectangular cross-section, connected in the input circuit and in the output circuit, respectively, of a source of oscillations here shown as a triode 20. The input guide comprises a loaded portion 1, within which there extends an elongated conductive bar 4, and an unloaded portion 2 remote from the tube 20. The output guide comprises a loaded portion 9, provided with an elongated conductive bar 8, and an unloaded portion 16 which does not quite reach the tube 20 since the latter is surrounded by the bar 8. The triode 20 has its plate terminal 21 coupled to the upper flange of guide portion 9 by a ring 22; its grid 23 has its cylindrical terminal 24 capacitively coupled, by way of annular gap 25, to the bar 8 and, thereby, to the upper flange of guide portion 1 and to the lower flange of guide portion 9. The cathode terminal 26 of tube 20 is conductively connected, through a coupling ring 27, to the loading bar 4 and, thereby, to the lower flange of guide portion 1. The gap 25 also serves for the feedback of energy from the output guide 9, 16 to the input guide 1, 2.

Means for tuning the unloaded guide portions 2 and 16 have been shown in the form of slidable pistons 3 which may, in the usual manner, extend over the entire cross section of the guide. A similar piston 11, forming a displaceable short circuit between the bar 8 and the upper flange of guide portion 9, serves for the tuning of the latter portion and may have a width substantially not exceeding that of the bar 8, as disclosed in connection with Fig. 8 of our above-identified co-pending application.

If the transverse magnetic-plane dimension of the guides 1, 2 and 9, 16 is shorter than half a wavelength at the fundamental operating frequency of the system, then this fundamental frequency (and possibly one or more lower-order harmonics thereof for which the same geometrical relationship obtains) will be greatly attenuated in the unloaded guide portion 16. This guide portion is provided with output means in the form of a coaxial line 17 whose outer conductor 10 is connected to the upper flange of the guide and whose inner conductor 7 terminates in a probe or coupling loop 5 within the guide. Suitable tuning of the unloaded guide portions 2 and 16 by means of the pistons 3 will provide optimum feedback conditions for the harmonic or group of harmonics to be recovered at the output 17; operation of the piston 11 in the loaded guide portion 9 will enable adjustment of the system to the desired fundamental oscillating frequency.

The arrangement of Fig. 2 differs from that of Fig. 1 mainly by the removal of the coaxial output connection 17 from the unloaded guide portion 16 to the loaded guide portion 8 (inner conductor 7 now being connected to the bar 8 of the latter portion) and by the introduction of loss material 6 into the unloaded portion 16. Also, the tuning means of Fig. 2 are shown to include, by way of example, studs 12 threadedly held in the bars 4 and 8 to assist in the tuning of loaded guide portions 1 and 9.

In Fig. 2 the presence of loss material 6 in the unloaded guide portion 16 will substantially dissipate the energy of the harmonic or group of harmonics to which the guide portion 16 is tuned, e.g. with the aid of its piston 3. The fundamental (and, if desired, one or more of its harmonics) may then be recovered at the output connection 17 from the loaded guide portion 9. If the unloaded guide portion 16 is not tuned, it will absorb substantially all the harmonics above the cutoff frequency defined by its geometrical dimensions. The loss material 6 may comprise strips of graphite or any other well-known type of resistance material.

Fig. 3 shows a frequency multiplier differing from the oscillators of Figs. 1 and 2, mainly, by the elimination of the feedback gap 25 and the provision of an extraneous source 15 for the excitation of the input circuit 1. A coupling ring 28 conductively connects the bar 8 to the grid terminal 24. Source 15, which may be any type of oscillator, energizes the guide 1 by way of a low-pass filter 14 and a coaxial line 13 whose outer conductor terminates at the bar 4 while its inner conductor is connected to the upper flange of the guide. The output connection 17 is connected, as in the case of Fig. 1, to the unloaded portion 16 of the output guide which is tuned to the desired harmonic (or group of harmonics) of the operating frequency of source 15. The tuning means 11, 12 in the input circuit enable the matching of the impedance of guide portion 1 to that of the feeder line 13. The purpose of filter 14 is to prevent the retransmission of harmonics toward the source 15.

It may be mentioned that, as already pointed out in our co-pending application, the three-element tube 20 may be replaced by a discharge device of the velocity-modulated (klystron) type whose input and output gaps would then occupy the position of the grid-cathode gap and of the grid-plate gap, respectively, of the triode 20.

The invention is, of course, not limited to the specific embodiments described and illustrated but may be realized in numerous modifications and adaptations thereof without departing from the spirit and scope of the appended claims. Thus it may be mentioned by way of example that the frequency multiplier shown in Fig. 3 may be converted into a frequency divider by removing the output line 17 to the loaded guide portion 9 and introducing loss material into the unloaded portion 16, substantially as shown in Fig. 2.

What is claimed as new and desired to be secured by Letters Patent is:

1. In a wave transmission system, in combination, a conductive wave guide, a source of high-frequency oscillations in said guide, capacitive loading means made of conductive material extending from said source through part of said guide, thereby dividing said guide into a loaded portion and an unloaded portion, said oscillations including at least one first component of relatively low frequency below the cutoff frequency of said unloaded portion but above the cutoff frequency of said loaded portion and further including at least one second component of relatively high frequency above the cutoff frequencies of both of said portions, first tuning means in said loaded portion adjusting same to resonance at said first component, second tuning means in said unloaded portion adjusting same to resonance at said second component, and output means at one of said portions for selectively recovering one of said components, whereby either at least one of the lowest components or at least one of the harmonics out of said oscillation can be selected depending upon which of said portions said output means is assembled with.

2. In a wave transmission system, in combination, an electron discharge device having at least three electrode terminals, an input circuit for said device including a first conductive wave guide coupled to a first combination of said terminals, an output circuit for said device including a second conductive wave guide coupled to a second combination of said terminals, said wave guides having substantially identical rectangular cross sections, a first capacitive loading bar of conductive material surrounding one of said terminals and extending therefrom through at least part of said first wave guide, a second capacitive loading bar of conductive material surrounding another of said terminals and extending therefrom through part of said second wave guide, thereby dividing the latter into a loaded portion and an unloaded portion, means including said discharge device for exciting high-frequency oscillations in said guides having a fundamental frequency less than the cutoff frequency of said unloaded portion but greater than the cutoff frequency of said loaded portion, thereby enabling only harmonics of said fundamental frequency to be propagated in said unloaded portion, and output means at one of said guide portions for extracting at least one component of said oscillations, whereby either at least one of the lowest components or at least one of the harmonics out of said oscillation can be selected depending upon which of said portions said output means is assembled with.

3. In a wave transmission system, in combination, an electron discharge device having an input circuit and an output circuit, a first conductive wave guide in said input circuit, a second conductive wave guide in said output circuit, first capacitive loading means made of conductive material extending from said discharge device through at least part of said first wave guide, second capacitive loading means extending from said discharge device through part of said second wave guide, thereby dividing the latter into a loaded portion and an unloaded portion, said first wave guide in the vicinity of said first loading means having a cutoff frequency substantially equal to that of said loaded portion, a source of oscillations having an operating frequency less than the cutoff frequency of said unloaded portion but greater than the cutoff frequency of said loaded portion, feed means connecting said source to said first wave guide, thereby exciting in said guides oscillations of said operating frequency and of harmonics thereof transmittable by said unloaded portion, and output means at said unloaded portion for extracting at least part of said harmonics.

4. In a wave transmission system, in combination, an electron discharge device having at least three electrode terminals, an input circuit for said device including a first conductive wave guide coupled to a first combination of said terminals, an output circuit for said device including a second conductive wave guide coupled to a second combination of said terminals, said wave guides having substantially identical rectangular cross sections, a first capacitive loading bar of conductive material surrounding one of said terminals and extending therefrom through at least part of said first wave guide, a second capacitive loading bar of conductive material surrounding another of said terminals and forming an annular gap therearound for feeding back energy from said output circuit to said input circuit, thereby exciting oscillations in said guides, said second loading bar extending through part of said second wave guide, thereby dividing the latter into a loaded portion and an unloaded portion, tuning means in at least one of said wave guides for adjusting the fundmental frequency of said oscillations to a value less than the cutoff frequency of said unloaded portion but greater than the cutoff frequency of said loaded portion, said unloaded portion thereby discriminating against said fundamental while being adapted to transmit at least one harmonic thereof, and output means at one of said guide portions for preferentially extracting at least one component of said oscillations, whereby either at least one of the lowest components or at least one of the harmonics out of said oscillation can be selected depending upon which of said portions said output means is assembled with.

5. In a wave transmission system, in combination, a conductive wave guide, a source of high-frequency oscillations in said guide, capacitive loading means made of conductive material extending from said source through part of said guide, thereby dividing said guide into a loaded portion and an unloaded portion, said oscillations including at least one first component of relatively low frequency below the cutoff frequency of said unloaded portion but above the cutoff frequency of said loaded portion and further including at least one second component above the cutoff frequencies of both of said portions, and output means at said unloaded portion for selectively recovering said second component.

6. In a wave transmission system, in combination, an electron discharge device having an input circuit and an output circuit, a first conductive wave guide in said input circuit, a second conductive wave guide in said output circuit, capacitive loading means made of conductive material extending from said discharge device through part of said second wave guide, thereby dividing the latter into a loaded portion and an unloaded portion, means including said discharge device for exciting high-frequency oscillations in said guides having a fundamental frequency less than the cutoff frequency of said unloaded portion but greater than the cutoff frequency of said loaded portion, loss material in said unloaded portion dissipating energy of harmonics of said fundamental frequency transmitted through said unloaded portion, and output means at said loaded portion for recovering said fundamental frequency substantially free from said harmonics.

7. A high frequency wave-selection device comprising in combination, a source for supplying high frequency oscillations of various harmoniously related frequencies; a pair of conductive wave guide means connected in the input and output circuits, respectively, of said source, each of said wave guide means comprising a loaded portion including loading means made of conductive material for rendering said loaded portion adapted to transmit at least one of the lowest components of said oscillations without substantial attenuation, and an unloaded portion adapted to offer a relatively high impedance to said lowest components; first tuning means located in at least one of said loaded portions for tuning the latter to the desired lowest frequency components of said oscillations; second tuning means located in at least one of said unloaded portions for tuning the latter to at least one of the higher components of said oscillations; and output means assembled with one of said portions in said output circuit for recovering at least one of said components from the particular one of said portions, whereby either at least one of the lowest components or at least one of the harmonics out of said oscillations can be selected and tuned out depending upon which of said portions said output means is assembled with.

References Cited in the file of this patent

UNITED STATES PATENTS

| | | |
|---|---|---|
| 2,253,589 | Southworth | Aug. 26, 1941 |
| 2,404,261 | Whinnery | July 16, 1946 |
| 2,514,779 | Martin | July 11, 1950 |
| 2,555,349 | Litton | June 5, 1951 |
| 2,556,881 | McArthur | June 12, 1951 |
| 2,633,493 | Cohn | Mar. 31, 1953 |
| 2,644,889 | Finke | July 7, 1953 |
| 2,660,667 | Bowen | Nov. 24, 1953 |
| 2,677,111 | Stahl | Apr. 27, 1954 |
| 2,682,641 | Sensiper | June 29, 1954 |
| 2,788,494 | Vogeley | Apr. 9, 1957 |
| 2,788,497 | Osial | Apr. 9, 1957 |

FOREIGN PATENTS

| | | |
|---|---|---|
| 142,487 | Australia | July 29, 1948 |